US010999405B2

(12) United States Patent
He et al.

(10) Patent No.: US 10,999,405 B2
(45) Date of Patent: May 4, 2021

(54) METHOD FOR PROCESSING ACCESS REQUESTS AND WEB BROWSER

(71) Applicant: ORANGE, Paris (FR)

(72) Inventors: Ruan He, Issy les Moulineaux (FR); Jamil Chawki, Lannion (FR)

(73) Assignee: ORANGE, Paris (FR)

( * ) Notice: Subject to any disclaimer, the term of this patent is extended or adjusted under 35 U.S.C. 154(b) by 344 days.

(21) Appl. No.: 14/654,446

(22) PCT Filed: Dec. 16, 2013

(86) PCT No.: PCT/FR2013/053099
§ 371 (c)(1),
(2) Date: Jun. 19, 2015

(87) PCT Pub. No.: WO2014/096660
PCT Pub. Date: Jun. 26, 2014

(65) Prior Publication Data
US 2015/0373148 A1 Dec. 24, 2015

(30) Foreign Application Priority Data
Dec. 20, 2012 (FR) .................................... 1262464

(51) Int. Cl.
*H04L 29/08* (2006.01)
*H04L 29/06* (2006.01)
(Continued)

(52) U.S. Cl.
CPC ............ *H04L 67/327* (2013.01); *G06F 9/452* (2018.02); *G06F 9/45504* (2013.01);
(Continued)

(58) Field of Classification Search
CPC .... G06F 11/2005; G06F 3/0635; G06F 9/452; G06F 9/45504; H04L 12/4641;
(Continued)

(56) References Cited

U.S. PATENT DOCUMENTS 8,051,180 B2 * 11/2011 Mazzaferri ........... G06F 3/1438
709/227
8,065,714 B2 * 11/2011 Budko .................... H04L 63/08
713/186

(Continued)

OTHER PUBLICATIONS

Access a plurality of virtualization platforms—Google Patent Search—Sep. 27, 2017.*

(Continued)

*Primary Examiner* — Philip J Chea
*Assistant Examiner* — Ruth Solomon
(74) *Attorney, Agent, or Firm* — Knobbe, Martens, Olson & Bear, LLP

(57) ABSTRACT

A method for processing access requests and a web browser are disclosed. In one embodiment, the processing method may be applied by a gateway maintaining a database containing, for each from among a plurality of computer virtualization platforms, at least one service provided by this platform and connection information to this platform. In one embodiment, the method comprises receiving an access request to a computer virtualization service provided by a platform transmitted by a web browser of a terminal and, if the requested service is in the database, generating from associated connection information in the database with this service, a system application adapted to the service. The system application may be configured to connect to the platform to allow the terminal to negotiate the establishment and maintenance of a communication session with the latter. The method may also comprise sending the system application to the web browser.

16 Claims, 4 Drawing Sheets

(51) Int. Cl.
    *G06F 9/455*  (2018.01)
    *G06F 9/451*  (2018.01)
(52) U.S. Cl.
    CPC .............. *H04L 67/02* (2013.01); *H04L 67/16* (2013.01); *H04L 67/34* (2013.01); *H04L 67/42* (2013.01); *H04L 67/141* (2013.01)
(58) Field of Classification Search
    CPC ....... H04L 67/02; H04L 67/42; H04L 67/327; H04L 67/16; H04L 67/34; H04M 15/41; H04M 15/58; H04M 15/61; H04M 15/70; H04M 2215/0164; H04M 3/085; H04M 3/2218; H04M 3/2227; H04W 24/08; H04W 8/18
    USPC .......... 709/220, 224, 225; 718/1; 707/999.01
    See application file for complete search history.

(56) References Cited

U.S. PATENT DOCUMENTS

| | | | | |
|---|---|---|---|---|
| 8,176,486 | B2* | 5/2012 | Amir Husain | G06F 9/445 709/223 |
| 8,769,011 | B2* | 7/2014 | Baird | H04L 67/02 709/204 |
| 8,966,004 | B2* | 2/2015 | Connelly | G06F 9/45558 709/217 |
| 9,069,587 | B2* | 6/2015 | Agarwal | G06F 9/45558 |
| 9,158,563 | B2* | 10/2015 | Hoff | G06F 8/61 |
| 9,294,549 | B2* | 3/2016 | Jakubowski | H04L 67/08 |
| 2007/0198656 | A1* | 8/2007 | Mazzaferri | G06F 9/54 709/218 |
| 2008/0201414 | A1* | 8/2008 | Amir Husain | G06F 9/445 709/203 |
| 2008/0301770 | A1 | 12/2008 | Kinder | |
| 2009/0168091 | A1* | 7/2009 | Fu | G06F 3/1204 358/1.15 |
| 2009/0222565 | A1* | 9/2009 | Ben-Shachar | H04L 63/101 709/229 |
| 2009/0327471 | A1* | 12/2009 | Astete | G06F 9/45533 709/223 |
| 2010/0058366 | A1* | 3/2010 | Swildens | G06F 11/3414 719/329 |
| 2010/0071035 | A1* | 3/2010 | Budko | H04L 63/08 726/4 |
| 2011/0083117 | A1* | 4/2011 | Vitanov | G06F 8/35 717/106 |
| 2011/0126110 | A1* | 5/2011 | Vilke | G06F 9/54 715/736 |
| 2011/0225511 | A1* | 9/2011 | Xu | G06Q 10/10 715/753 |
| 2012/0036561 | A1* | 2/2012 | Budko | H04L 63/08 726/4 |
| 2012/0066679 | A1* | 3/2012 | Pappas | G06F 9/45558 718/1 |
| 2012/0096071 | A1* | 4/2012 | Murphey | G06F 8/63 709/203 |
| 2012/0096364 | A1* | 4/2012 | Wilkinson | G06F 9/505 715/740 |
| 2012/0096461 | A1* | 4/2012 | Goswami | G06F 9/45558 718/1 |
| 2012/0233629 | A1* | 9/2012 | Swildens | G06F 11/3414 719/328 |
| 2012/0284632 | A1* | 11/2012 | Baird | G06F 9/452 715/749 |
| 2012/0317295 | A1* | 12/2012 | Baird | H04L 67/02 709/228 |
| 2012/0331406 | A1* | 12/2012 | Baird | H04L 67/02 715/760 |
| 2013/0086202 | A1* | 4/2013 | Connelly | G06F 9/45558 709/217 |
| 2013/0145361 | A1* | 6/2013 | Kaegi | H04L 67/10 717/176 |
| 2013/0212288 | A1* | 8/2013 | Jakubowski | H04L 67/08 709/228 |
| 2013/0263088 | A1* | 10/2013 | Hoff | G06F 8/61 717/121 |
| 2014/0122875 | A1* | 5/2014 | Pizi | G06F 9/4445 713/164 |
| 2014/0123231 | A1* | 5/2014 | Low | H04L 63/0892 726/4 |
| 2014/0173591 | A1* | 6/2014 | Lin | G06F 9/45533 718/1 |

OTHER PUBLICATIONS

Virtual, virtualization, application, service, webpage—Google Patent Search—Sep. 27, 2017.*
Jennings, et al. Oct. 9, 2012. Real-time communication in WEB-browsers (Active WG). Retrieved Nov. 18, 2015 from http://tools.ietf.org/wg/rtcweb/charters?item=charter-rtcweb-2012-10-09.txt, 2 pages.
Rosenberg, et al. Jun. 2002. SIP: Session Initiation Protocol. RFC 3261. The Internet Society. 240 pages.
Uberti, et al. Mar. 3, 2012. Javascript Session Establishment Protocol, draft-ietf-rtcweb-jsep-00. Internet Engineering Task Force (IETF).
W3C. Dec. 17, 2012. HTML5: A vocabulary and associated APIs for HTML and XHTML. Retrieved Nov. 18, 2015 from http://www.w3.org/TR/2012/CR-html5-20121217/, 21 pages.
W3C Editor's Craft. Dec. 12, 2012. WebRTC 1.0: Real-time communication between browsers. Retrieved Nov. 18, 2015 from http://dev.w3.org/2011/webrtc/editor/archives/20121212/webrtc.html, 30 pages.
International Search Report dated Apr. 2, 2014 for International Application No. PCT/FR2013/053099 filed Dec. 16, 2013.

* cited by examiner

| VDI - PLATF 3 | VS3 | CX-INFO 3 |
| SBC - PLATF 4 | VS4 | CX-INFO 4 |
| WEB - b - PLATF 5 | VS5 | CX-INFO 5 |

~9

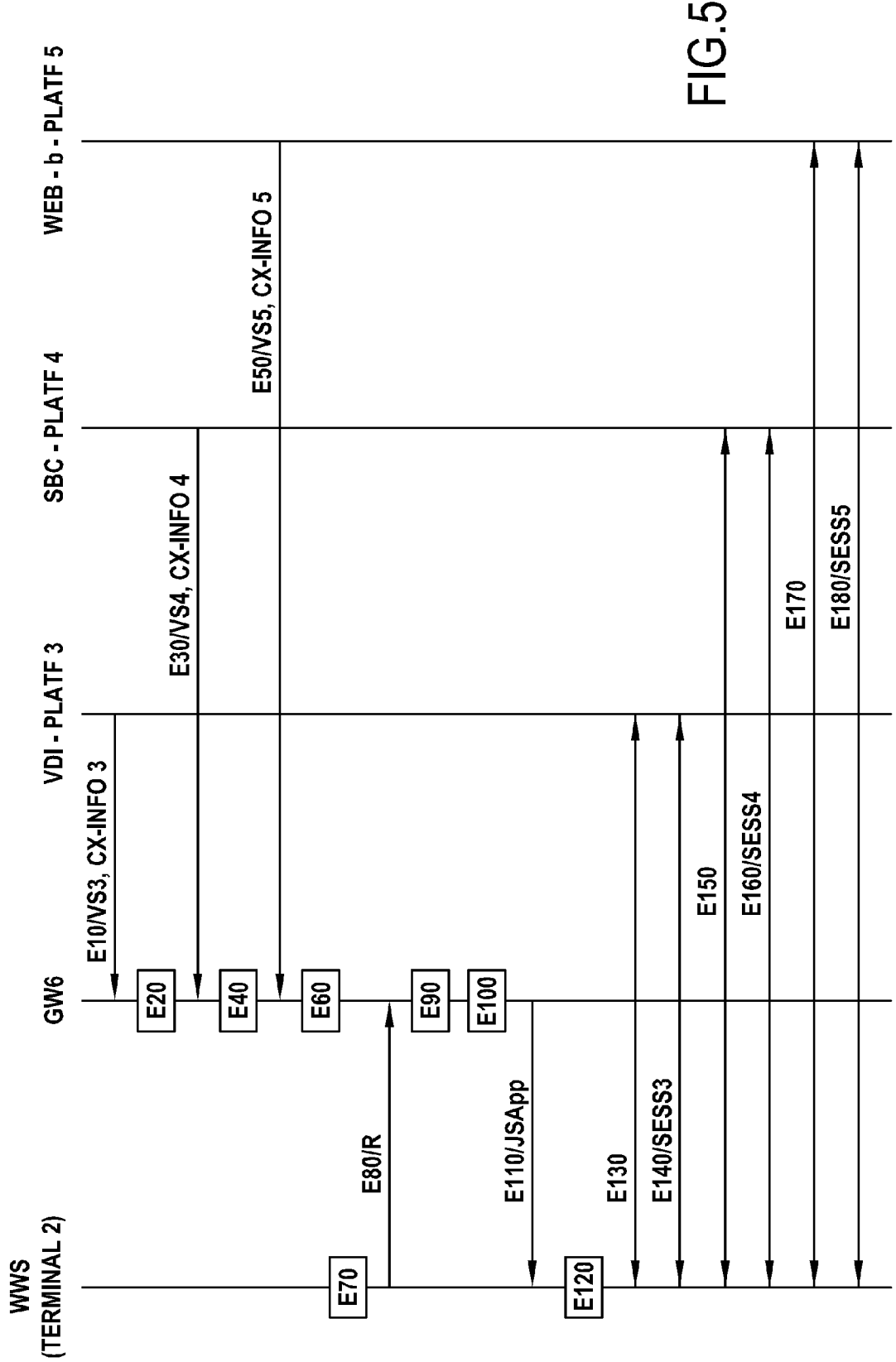

METHOD FOR PROCESSING ACCESS REQUESTS AND WEB BROWSER

RELATED APPLICATIONS

This application is the U.S. National Phase of Application No. PCT/FR2013/053099 entitled "METHOD FOR PROCESSING ACCESS REQUESTS AND WEB BROWSER" filed Dec. 16, 2013, which designated the United States, and which claims the benefit of French Application No. 1262464 filed Dec. 20, 2012.

BACKGROUND OF THE INVENTION

The invention relates to the general field of telecommunications.

It more particularly relates to the field of computer virtualization techniques, such as the techniques which allow a virtual working environment to be generated, accessible via a workstation of a user.

In a known way, computer virtualization consists of installing and/or operating on one or several remote servers, an operating system or an application, and of sending back an image or a virtual representation of this operating system or of this application to the user on his/her terminal (for example on his/her workstation), this image being connected to the remote server(s) hosting the operating system or the application. Computer virtualization therefore relies on decoupling between hardware and software, totally transparent for the user.

It has many advantages for companies, notably in terms of maintenance and management of their installed computers. Moreover, they give the possibility of easily managing mobility of the users: a user is actually no longer dependent on his/her physical workstation but may connect to his/her workstation from different physical terminals.

Various solutions of computer virtualization exist in the present state of the art, and are proposed by providers of virtualization services via virtualization platforms (for example a server).

The VDI (for "Virtual Desktop Infrastructure") solution for example proposes the integration of the notion of computer virtualization into the working environment of the users. It consists of operating the operating system of each user workstation on a single central hosting server and of having each operating system converse with the workstation with which it is associated via a remote display procedure, which is based on a flow broadcasting protocol also known under the name of streaming protocol. The workstation of the user then only has on board a light client software package, i.e. requiring limited computer resources and not consuming much energy.

The VDI solution advantageously relies on a relatively simple architecture and provides large capability of customizing the working environment of the user.

However, the streaming protocol applied between the central hosting server and the workstations requires significant resources in terms of bandwidth, and stable connectivity. In the case of a small available bandwidth, display difficulties for certain flows on the workstations may be encountered.

Moreover, updating applications on-board operating systems via this solution may sometimes prove to be difficult to manage.

An alternative to the VDI solution is the SBC (for "Server-Based Computing") virtualization, which proposes centralized virtualization of applications. This solution consists of having remote applications operate on servers, and of sending back their image on the terminal of the user via a video flow broadcasting protocol. Only applications are virtualized according to the SBC solution (not the operating systems).

This solution gives the possibility of easily managing the application from end-to-end, and notably their installation/deinstallation and their maintenance.

However, like the VDI solution, it requires significant resources in terms of bandwidth. Moreover, incompatibilities may be encountered with certain applications because of their execution on a remote server rather than within the operating system of the workstation of the user.

Another proposed solution in the state of the art consists in the virtualization of applications and/or of operating systems based on a web interface. According to this solution, a web server provides application services (i.e. of contents) hosted by different servers and provides these services as a web page to the user thereby forming again a virtual desktop. Each operation carried out by the user on the web page is sent back towards the web server for being carried out. This solution generally relies on the HTML language (HyperText Markup Language) or one of its revisions such as the HTML 5 revision.

It has the advantage of consuming few resources because of the use of web pages. However, this solution does not have a very significant customization capability.

Thus, depending on the context in which is found the user and on his/her needs in terms of virtual environment, it may be proved to be meaningful to contemplate either one of these virtualization solutions. However, today no system exists allowing integration of distinct virtualization solutions such as for example the aforementioned VDI, SBC or virtualization solutions based on a web interface.

OBJECT AND SUMMARY OF THE INVENTION

The invention gives the possibility of notably overcoming this drawback by proposing a computer virtualization solution relying on an architecture based on three main actors, i.e.:
 a web browser installed on the terminal of the user;
 a plurality of virtualization platforms providing virtualization services for operating systems, for a working environment or of applications, relying on diverse technologies, such as notably on the aforementioned technologies of the VDI, SBC type and/or based on a web interface; and
 a virtualization gateway, producing the interface between the terminal, and more specifically its browser, and the virtualization platforms, and which allows negotiation, establishment and maintaining of communication sessions between the terminal and the various virtualization platforms so as to generate a customized virtual computer environment for the user of the terminal.

According to the invention, the virtualization gateway, upon receiving an access request for a virtualization service provided by one of the virtualization platforms stemming from the browser of the terminal, generates a system application comprising a module for connecting to this platform intended to allow the terminal to negotiate and maintain a communication session with the platform in order to access the virtualization service provided by this platform. This system application is generated from connection information transmitted by the virtualization platform relating to the virtualization service requested by the terminal (e.g. the URL (Uniform Resource Locator), the port(s) on which to connect, supported authentication mechanisms, the protocol used for initiating a session, etc.). It is preferably generated in JavaScript® language so as to be generic and to be able to be executed by the majority or even the totality of the web browsers which may be installed on the terminals.

In the sense of the invention, by system application is meant an application including parameters or scripts for connecting to the platform, determined from connection information transmitted by the platform to the gateway. This system application is adapted to the virtualization service requested by the terminal in the sense that it takes into account the specificities of this service in terms of connection (e.g. the protocol used for initiating a session in order to connect onto the virtualization service, the authentication method, the URL and connection ports, etc.). Such parameters or scripts are required in order to allow the terminal to connect to the platform, in other words this is a prerequisite for negotiating and establishing a communication session with the platform in order to access the virtualization service provided by the latter.

It should be noted that such a system application is active, i.e. it executes on the browser in order to initiate the connection with the associated platform. In this sense, it is opposed to a said conventional passive content application (also known under the name of "cookie"), which does not contain such connection parameters and which does not launch any process in the browser, but only contains content elements in connection with the invoked service.

The system application generated by the gateway also preferably contains a stack of communication protocols (for example including ciphering algorithms, codecs, the graphic interface used for remotely transferring the virtual environment, the transport protocol for communication flows like VDI or SBC exchanged between the terminal and the platform, etc.) intended to be used by the terminal during its communications with the platform. This stack of protocols is both adapted to the technical characteristics of the terminal and to the requested service.

The system application is advantageously transmitted by the virtualization gateway to the web navigator of the terminal, and not to its operating system, so as to benefit from the advantages described earlier associated with virtualization solutions based on a web interface (limited required resources, notably in terms of bandwidth, light client software at the terminal, execution simplicity, etc.). The terminal may thus access different virtualization services exclusively via its web browser, which has the advantage of providing a solution independent of the operating system of the terminal.

The invention therefore proposes a generic and relatively flexible architecture allowing a terminal to benefit from a plurality of virtualization solutions. The terminal may thus easily establish a communication session with any type of virtualization platform and access the service provided by the latter, independently of its operating system.

In order to support this architecture, the invention according to a first aspect is directed to a method for treating access requests to computer virtualization services, applied by a virtualization gateway, this gateway maintaining a database containing, for each platform from among a plurality of virtualization platforms, at least one computer virtualization service provided by this platform and connection information allowing access to said at least one service via this platform.

According to the invention, this treatment method comprises:

a step for receiving an access request from a terminal to a computer virtualization service provided by a virtualization platform, this access request having been transmitted by a web browser installed on the terminal;

if the service requested by the terminal is contained in the base maintained by the gateway, a step for generating, from connection information associated in the base with this service, a system application adapted to the service, this system application comprising a module for connecting to the virtualization platform providing the service, able to allow the terminal to negotiate establishment and maintaining of a communication session with the platform; and a step for sending the generated system application to the web browser installed on the terminal.

Correlatively, the invention is also directed to a virtualization gateway comprising:

a database containing, for each platform from among a plurality of virtualization platforms, at least one computer virtualization service provided by this platform and connection information allowing access to said at least one service via said platform;

a module for receiving an access request from a terminal to a computer virtualization service provided by a virtualization platform, this request having been transmitted by a web browser installed on the terminal;

a checking module, activated upon receiving the access request, capable of checking whether the virtualization service requested by the terminal is contained in the database;

a module for generating, activated if the virtualization service requested by the terminal is contained in the database, a system application adapted to the requested virtualization service, from connection information associated in the base with said service, this system application comprising a module for connecting to the virtualization platform providing said service, able to allow the terminal to negotiate the establishment and maintaining of a communication session with said platform; and a module for sending the system application generated by the generation module to the web browser installed on the terminal.

The database maintained by the gateway for example comprises connection information (ex. connection parameters, URL (uniform resource locator) of the platforms, connection ports, etc.) relating to at least two virtualization platforms from among:

a virtualization platform of the VDI type;

a virtualization platform of centralized applications of the SBC type; and a virtualization platform of applications and/or of operating systems using a web interface.

The solution proposed by the invention is advantageously very flexible, and easily supports the addition and/or the suppression of virtualization platforms via the updating of the database by the virtualization gateway.

For this purpose, in a particular embodiment, the treatment method further comprises:

at least one step for receiving a message from a virtualization platform identifying at least one computer virtualization service provided by this platform and containing connection information for accessing said at least one service via this virtualization platform; and a step for updating the base with the identified service and the connection information contained in the received message.

These messages may be sent asynchronously by the virtualization platforms, notably depending on the changes performed by these virtualization platforms affecting the virtualization services which they provide, and/or on the changes concerning the connection information communicated to the virtualization gateway.

Alternatively, they may be sent periodically to the virtualization gateway or upon request from the latter.

The invention allows a dynamic configuration of the terminal, via the sending of a system application adapted to the virtualization service requested by the latter. This configuration allows the terminal to initiate a communication session via its web browser with the virtualization platform providing the service which the terminal intends to access. This dynamic configuration allows adaptation to the changes which may affect the virtualization services provided by the platforms and the connection information required for accessing these services.

In a particular embodiment of the invention, the system application generated by the gateway further comprises a stack of communication protocols adapted to the terminal and/or to the service, and intended to be applied upon a communication session between the terminal and the virtualization platform.

This embodiment notably allows adaptation to the technical characteristics of the terminal and more particularly of its web browser. Thus notably, the system application may be different depending on whether the terminal is a fixed workstation or a smart telephone also known under the name of "smartphone".

Similarly, including into this stack of protocols a codec for communication flows different according to whether the virtualization service is a service of the VDI or SBC type or further based on the web interface may be contemplated.

The invention therefore allows further customization of the virtual computer environment provided to the user of the terminal.

In another embodiment, the system application further comprises modules for connecting to the other platforms from among the plurality of virtualization platforms capable of allowing the terminal to negotiate the establishment and maintaining, where applicable, of communication sessions with these other platforms.

In this way, the virtual computer environment proposed to the user of the terminal is complete as soon as it is established, and groups modules for connecting to the different virtualization platforms on which the user may act for virtualization of his/her environment.

The virtualization gateway may then content itself by applying these connection modules, if this is necessary (in other words if a change affecting these modules has been reported to the gateway), when it receives a new request from the browser of the terminal for accessing one of the virtualization services provided by the platforms.

As mentioned earlier, the architecture proposed by the invention for supporting diverse computer virtualization services provided by distinct platforms, also relies on the browser intended to be installed on the terminal of the user, and which is capable of notably executing the system application transmitted by the gateway, as well as on the terminal of the user on which this browser is installed.

Thus, according to a second aspect, the invention is directed to a method for initiating by a web browser installed on a terminal, access by this terminal to a computer virtualization service provided by a virtualization platform, said method comprising:

a step for sending a request for accessing the computer virtualization service by the web browser to a virtualization gateway;

a step for receiving, by the web browser, from the virtualization gateway, a system application adapted to the requested computer virtualization service, and comprising a module for connecting to the virtualization platform providing this service, capable to allow the terminal to negotiate the establishment and maintaining of a communication session with the platform; and a step for executing by the web browser the received system application, comprising negotiation of the establishment and maintaining of a communication session with the virtualization platform in order to access the virtualization service, by means of the connection module.

Correlatively, the invention is also directed to a web browser intended to be installed on a terminal, this web browser comprising:

a sending module capable of sending to a virtualization gateway a request for access to a computer virtualization service provided by a virtualization platform;

a receiving module capable of receiving from the virtualization gateway, a system application adapted to the terminal and to the requested computer virtualization service, and comprising a module for connecting to the virtualization platform providing the service, capable to allow the terminal to negotiate the establishment and maintaining of a communication session with this platform;

an execution module capable of executing the received system application and of negotiating the establishment and maintaining of a communication session with the platform in order to access the virtualization service by using the connection module contained in the system application.

As mentioned earlier, a user may thus advantageously access a plurality of virtualization services in return for installing on his/her terminal a web browser according to the invention. The client allowing the user to access a virtual environment via his/her terminal is therefore relatively lightweight, which gives the possibility of limiting the complexity at the terminal required for implementing the invention.

Moreover, this web browser gives the possibility of providing a generic solution, which does not depend on the operating system supported by the terminal.

By means of the invention, the virtual computer environment, from which the user of the terminal benefits, may rely on distinct virtualization techniques (e.g. SBC, VDI, based on a web interface, etc.). Different communication sessions may therefore coexist simultaneously between the terminal and the different virtualization platforms.

In order to come to terms with this situation, the invention proposes, according to a third aspect, a method for management (i.e. maintaining) a virtual computer environment, this method being intended to be applied by a web browser installed on a terminal and comprising:

a step for establishing, in this virtual computer environment, at least one communication session with at least one virtualization platform providing a computer virtualization service, at least one said communication session being established following the application by the web browser of an initiation method according to the invention; and a step for maintaining the virtual computer environment using:

a state machine defining different possible states for the virtual computer environment (e.g. initialization, synchronization with the virtualization platforms, current virtualization service, etc.); and for each virtualization platform with which a communication session is established in the virtual computer environment during the establishment step, a state machine defining different possible states for this communication session (initialization of the session, invoking the service, offline session, re-initialization of the session, etc.).

Correlatively, in a particular embodiment of the invention, the web browser with which the terminal is equipped further comprises a module for managing a virtual computer environment in which at least one communication session with at least one virtualization platform providing a computer virtualization service is established following negotiation with this platform by the execution module, this management module being able to use, in order to maintain this virtual computer environment:

a state machine defining different possible states for the virtual computer environment (e.g. initialization, synchronization with the virtualization platforms, current virtualization service, etc.); and for each virtualization platform with which a communication session is established in the virtual computer environment during the establishment step, a state machine defining different possible states for this communication session (initialization of the session, invoking the service, offline session, re-initialization of the session, etc.).

In other words, the management method according to the invention for maintaining and controlling the virtual environment provided to the user of the terminal, is based on state machines with two levels, and more specifically:

on a said global state machine, which defines the different states which the virtual environment may assume in its global nature, and on a plurality of state machines relative to each communication session established with a virtualization platform, and which define the different states of each of these sessions.

This two-level control in return for reasonable complexity, gives the possibility of guaranteeing at any moment accessibility by the user to a virtual computer environment on the one hand, and the compatibility between the different co-existing virtualization solutions in this virtual environment and proposed to the user on the other hand.

The invention is also directed to a terminal on which a web browser is installed according to the invention.

In a particular embodiment, the different steps of the processing method, of the initiation method and/or of the management method are determined by instructions of computer programs.

Accordingly, the invention is also directed to a computer program on an information medium, this program being able to be applied in a virtualization gateway or more generally in a computer, this program including instructions adapted for applying the steps of a processing method as described above.

The invention is also directed to a computer program on an information medium, this program being able to be applied in a web browser, in a terminal or more generally in a computer, this program including instructions adapted for applying the steps of an initiation method as described above.

The invention is also directed to a computer program on an information medium, this program being able to be applied in a web browser, in a terminal or more generally in a computer, this program including instructions adapted for applying the steps of a method for managing a virtual environment as described above.

These programs may use any programming language, and be in the form of source codes, object codes, or intermediate codes between source code and object code, such as in a partly compiled form, or in any other desirable form.

The invention is also directed to an information medium legible by a computer, and including instructions of a computer program as mentioned above.

The information medium may be any entity or device capable of storing the program. For example, the medium may include a storage means, such as a ROM, for example a CD ROM or a ROM of a microelectronic circuit, or further a magnetic recording means, for example a diskette (floppy disc) or a hard disc.

On the other hand, the information medium may be a transmissible medium such as an electric or optical signal which may be conveyed via an electric or optical cable, by radio or by other means. The program according to the invention may in particular be downloaded onto a network of the Internet type.

Alternatively, the information medium may be an integrated circuit into which the program is incorporated, the circuit being adapted for executing or for being used in the execution of the relevant method.

According to a fourth aspect, the invention is also directed to a computer system comprising:

a plurality of virtualization platforms providing computer virtualization services;

a terminal on which is installed a web browser according to the invention, capable of sending an access request to a said computer virtualization service provided by a said virtualization platform; and a virtualization gateway according to the invention, capable of processing this access request.

The plurality of virtualization platforms for example comprises at least two platforms from among:

a virtualization platform of the VDI type;

a virtualization platform of applications of the SBC type; and a virtualization platform of applications and/or operating systems using a web interface.

In a particular embodiment, at least one said virtualization platform is capable to send asynchronous messages to the virtualization gateway informing it on the computer virtualization services which it provides and containing connection information associated with these virtualization services.

In this way, the virtualization gateway may easily update the database so as to have available adapted connection information when the terminal requires access to a virtualization service. This facilitates the access to the services and provides great flexibility: it is easily possible to add, or even to suppress virtualization services in the database maintained by the gateway.

According to a fifth aspect, the invention is directed to a database, maintained by a virtualization gateway containing, for each platform from among a plurality of virtualization platforms, at least one computer virtualization service provided by this platform and connection information giving the possibility of accessing said at least one service via this platform.

In other embodiments, it may also be contemplated that the processing method, the initiation method, the management method, the virtualization gateway, the web browser, the terminal, the system and the database according to the invention have all or part of the aforementioned features combined with each other.

SHORT DESCRIPTION OF THE DRAWINGS

Other features and advantages of the present invention will become apparent from the description made below, with reference to the appended drawings which illustrate exemplary embodiments thereof without any limitation. In the figures:

FIG. 1 illustrates a computer system, a virtualization gateway and a terminal according to the invention in a particular embodiment;

FIGS. 2A, 2B and 2C respectively illustrate functional architectures of virtualization platforms which may provide virtualization services to the terminal of FIG. 1;

FIGS. 3A and 3B respectively illustrate the material architectures of the terminal and of the gateway of FIG. 1;

FIG. 5 illustrates, as a diagram, the main steps of a processing method and of an initiation method as respectively applied by the gateway and by the terminal of FIG. 1, in a particular embodiment.

DETAILED DESCRIPTION OF THE INVENTION

Figure 1:
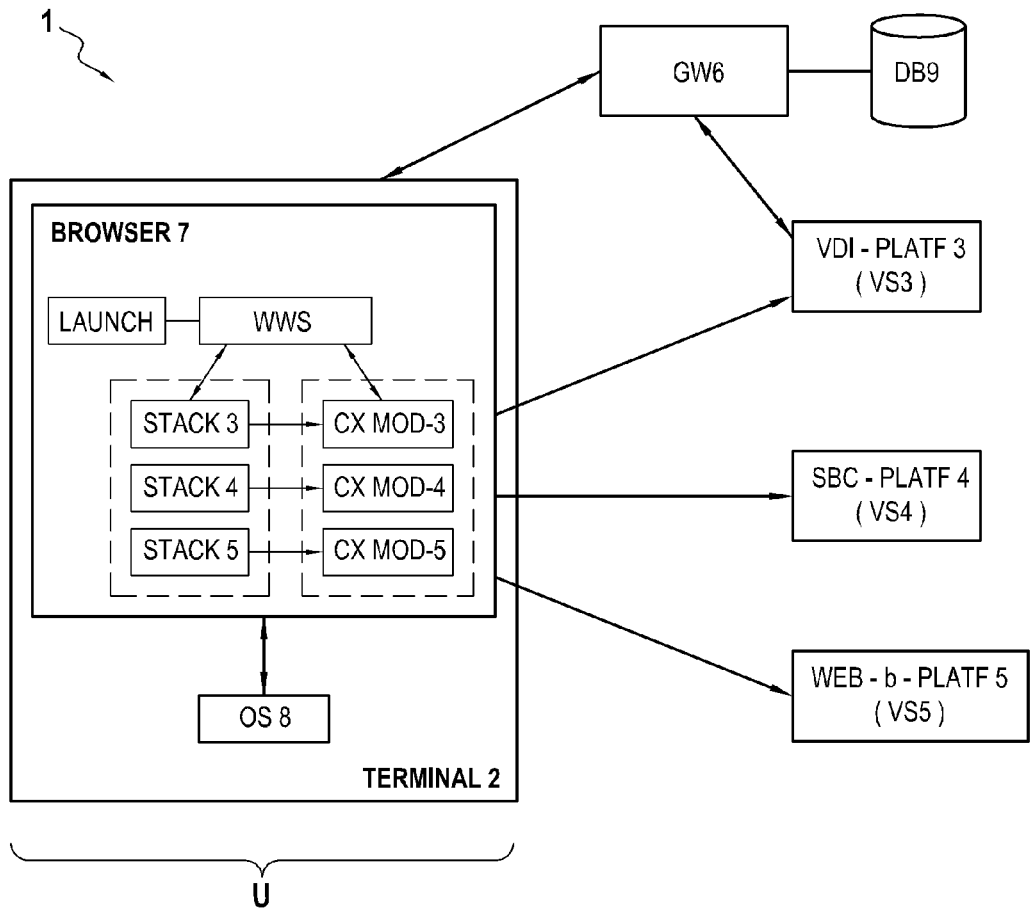

FIG. 1 describes, in its environment, a computer system 1 according to the invention, in a particular embodiment.

According to the invention, the system 1 provides the possibility to a user U of a terminal 2 of benefiting from a virtual computer environment VE (such as a virtual desktop environment), wherein one or several communication sessions may be established with virtualization platforms implementing distinct virtualization solutions.

In the example illustrated in FIG. 1, three distinct virtualization platforms 3, 4 and 5 are considered, respectively implementing a virtualization solution of the VDI type, a centralized virtualization solution for applications of the SBC type, and a virtualization solution of applications and/or of operating systems using a web interface. Each of these platforms provides a virtualization service (i.e. a VS3 service, a VS4 service and a VS5 service respectively), applying the virtualization solution implemented by the platform. They may be managed by distinct operators or by a same operator.

Figure 2A:
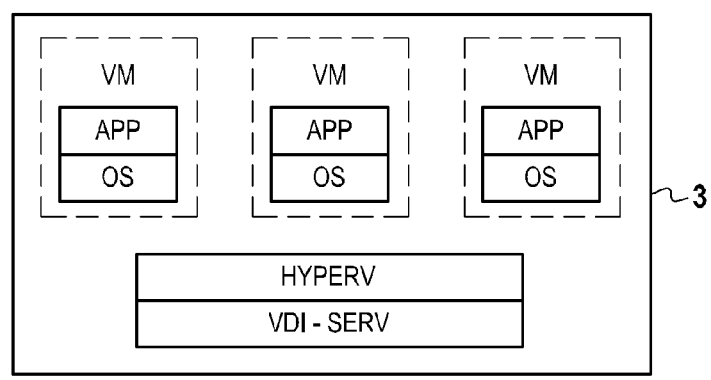
Figure 2B:
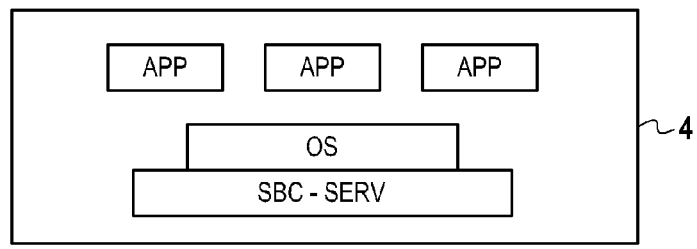
Figure 2C:
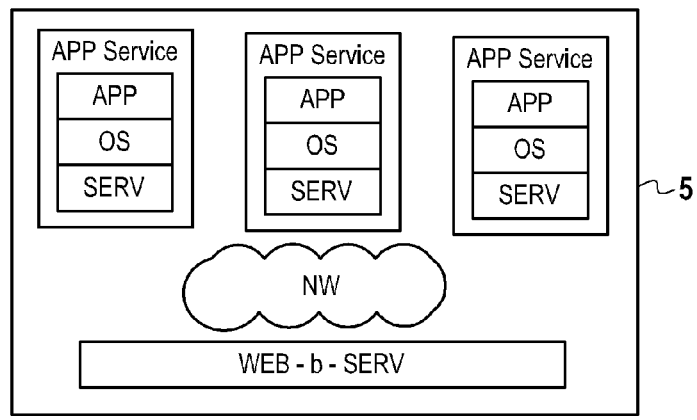

The functional architectures of the virtualization platforms 3, 4 and 5 are schematically illustrated in FIGS. 2A, 2B and 2C respectively. These architectures are known to the person skilled in the art and are not described here in detail.

Thus, with reference to FIG. 2A, the virtualization platform 3, which proposes the virtualization service VS3 and is based on a solution of the VDI type, relies on a hypervisor HYPERV based on a VDI-SERV server, and on one or several virtual machines VM executing operating systems.

With reference to FIG. 2B, the virtualization platform 4, which proposes the virtualization service of applications VS4 and is based on a centralized solution of the SBC type, relies on an operating system OS implemented on an SBC-SERV server, and on one or several application servers APP.

With reference to FIG. 2C, the virtualization platform 5, which proposes the virtualization service of applications and/or of operating systems VS5 and is based on a solution using a web interface, relies on a WEB-b-SERV server which interacts via a NW network with one or several APP-SERVICE services supported by SERV servers.

Of course, no limitation is attached to the number of relevant virtualization platforms for applying the invention or to the specific virtualization solutions supported by these platforms, the invention also being applied to a different number of platforms and to other virtualization solutions. Moreover application of the invention may be contemplated in a context wherein several virtualization platforms from among the plurality of relevant platforms support the same virtualization solution but are managed by different operators.

According to the invention, the system 1 is based on a three-party architecture for establishing and maintaining the virtual environment VE requested by the user U. More specifically, it comprises:

the terminal 2 of the user U;
the virtualization platforms 3, 4 and 5; and
a virtualization gateway 6 (or virtualization server), according to the invention, producing the interface between the terminal 2 and the virtualization platforms 3, 4 and 5 for establishing communication sessions between these entities within the context of a virtual environment VE.

The terminal 2 of the user U is a terminal according to the invention. This may be any terminal, such as for example a fixed or portable computer, a smart telephone or "smartphone", etc.

A web browser 7 according to the invention is installed on this terminal, using the HTML language for displaying web pages. The terminal 2 is further equipped with an operating system 8.

In the embodiment described here, the web browser 7 supports the HTML version 5 (HTML5), as defined by the standardization consortium W3C (World Wide Web Consortium). More extensive details on this version are available on the internet site of W3C (www.w3C.org).

The browser 7 moreover supports the JavaScript® language and is capable as such of executing applications written in this language, and notably active JavaScript® system applications, i.e. which execute on the web browser 7 in order to initiate a connection with a determined platform of services. In other words, the web browser 7 provides an environment allowing execution of these JavaScript® system applications.

Figure 3A:
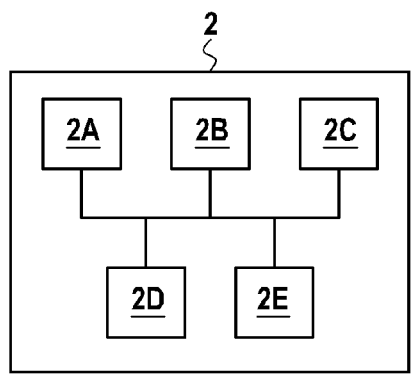

In the embodiment described here, the terminal 2 has the hardware architecture of a computer, schematically illustrated in FIG. 3A.

It notably includes a processor 2A, a ROM memory 2B, a RAM memory 2C, a non-volatile 2D memory and communication means 2E with notably a virtualization gateway 6 and with virtualization platforms 3, 4, 5. These communication means 2E for example integrate a network board, known per se and not detailed here.

The ROM memory 2B of the terminal forms a recording medium according to the invention, readable by the processor 2A and on which are recorded:

a computer program according to the invention, including instructions for executing the steps of an initiation method according to the invention; and a computer program including instructions for executing the steps of a management method according to the invention, the steps of the initiation and management methods being described later on with reference to FIGS. 5 and 6, in a particular embodiment.

These computer programs define in an equivalent way, functional modules of the web browser 7, and more specifically a management module WWS of the virtual environment VE which here notably comprises a module for sending access requests to the virtualization services provided by the platforms 3, 4 and 5, a module for receiving one or several system applications allowing the terminal 2 to initiate and maintain a session with the platforms 3, 4 and 5, and a module for executing system applications, and which is able to manage the establishment and maintaining of communication sessions with the platforms of services 3, 4 and 5, as well as with the gateway 6.

These modules are JavaScript® modules, participating in the application of the invention. Their functions will be described subsequently in more detail with reference to the steps of the initiation and management methods, on the basis of FIGS. 5 and 6.

Figure 3B:
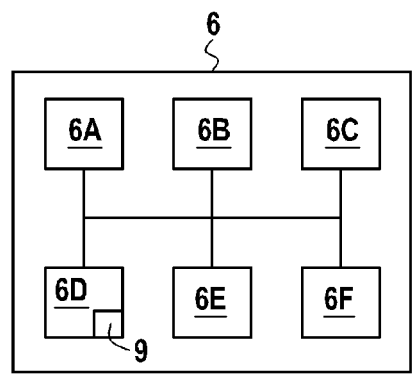

As mentioned earlier, the virtualization gateway 6 producing the interface between the terminal 2 and the virtualization platforms 3, 4 and 5 is compliant with the invention. In the embodiment described here, this gateway 6 is a web server having the hardware architecture of a computer, as illustrated in FIG. 3B.

More specifically, the gateway 6 notably includes a processor 6A, a ROM memory 6B, a RAM memory 6C, a non-volatile memory 6D and communication means 6E with notably the terminal 2 and the virtualization platforms 3, 4, 5. These communication means 6E for example integrate a network card, known per se and not detailed here.

It should be noted that in the embodiment described here, the gateway 6 supports version 5 of the HTML language (HTML5) as well as the JavaScript® language, in order to be able to communicate with the terminal 2 and notably the browser 7 of this terminal. In other words, the sending, receiving and generating modules of the platform 6 are able to use these languages in their interactions with the browser 7 of the terminal 2.

The ROM memory 6B of the gateway 6 is a recording medium according to the invention, readable by the processor 6A and on which is recorded a computer program according to the invention, including instructions for executing the steps of a processing method according to the invention, the steps of this processing method being described subsequently with reference to FIG. 5, in a particular embodiment.

This computer program defines in an equivalent way functional modules of the gateway 6, such as notably a module for receiving access requests to the services VS3, VS4, VS5, from the browser 7 of the terminal 2 (i.e. HTTP request), a module for checking the compatibility of the virtualization service requested by the terminal 2 with the services provided by the platforms 3, 4 and 5, a module for generating one or several system applications intended to allow the terminal 2 to connect to the platforms 3, 4 and 5 for accessing the virtualization services provided by these platforms, and a module for sending this or these system application(s) to the browser 7 of the terminal 2 via an HTTP response. These modules are for example here JavaScript® modules, participating in the application of the invention.

Their functions will be described subsequently in more detail with reference to the steps of the processing method illustrated in FIG. 5.

According to the invention, the gateway 6 maintains a database 9, stored in memory here in its non-volatile memory 6D. This database 9 contains for each platform from a plurality of virtualization platforms, at least one computer virtualization service provided by this platform and connection information allowing access to this service via this platform. This connection information for example contains an URL allowing access to the platform, the ports used for accessing the service, the designation of the required protocol for initiating a session, authentication mechanisms (ex. SAML (Security Assertion Markup Language) or Kerberos Token), etc. or any other preliminary information required for connecting to the platform and negotiating the establishment or the maintaining of a communication session with the latter.

Figures 4, 6:
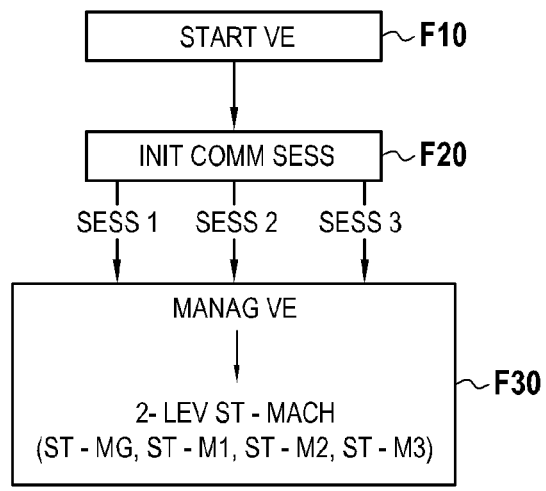
FIG. 4 illustrates an exemplary database maintained by the virtualization gateway of FIG. 1.
FIG. 6 illustrates, as a computer flow chart, the main steps of a method for managing a virtual environment applied by the terminal of FIG. 1, in a particular embodiment.

An example of the database 9 is illustrated in FIG. 4, within the context of FIG. 1 (i.e. three virtualization platforms 3, 4, 5 providing the virtualization services VS3, VS4 and VS5, respectively).

Thus, according to this example, the database 9 identifies the three platforms 3, 4, 5 and contains:

for the virtualization platform 3: the virtualization service VS3 and the connection information CX-INFO3 allowing access to the service VS3 via the platform 3;

for the virtualization platform 4: the virtualization service VS4 and the connection information CX-INFO4 allowing access to the service VS4 via the platform 4; and for the virtualization platform 5: the virtualization service VS5 and the connection information CX-INFO5 allowing access to the service VS5 via the platform 5.

In the example contemplated in FIG. 1, one is limited to one virtualization service per platform. However, this assumption is not limiting and it is possible to contemplate other configurations.

The database 9 is updated by the gateway 6 upon receiving messages transmitted by the virtualization platforms 3, 4, and 5. Via these messages, the virtualization platforms publish (i.e. identify) the virtualization services which they propose, as well as the connection information required for accessing these services through them. Moreover, they may inform the gateway 6 on the availability of the servers involved in the provision of these virtualization services.

These messages are sent here asynchronously by the platforms 3, 4 and 5.

Alternatively, they may be periodically sent or upon request from the gateway.

Upon receiving these messages, the gateway 6 updates the database 9, so as to reflect the current connection information relating to the virtualization platforms 3, 4 and 5 and to the virtualization services provided by these gateways.

We shall now describe, with reference to FIGS. 5 and 6, the main steps of the processing method applied by the gateway 6, and the main steps of the maintaining and initiation methods applied by the terminal 2, in a particular embodiment, upon establishing the virtual computer environment VE requested by the user U of the terminal 2.

As a preliminary, it is assumed that, as mentioned earlier, the platforms 3, 4 and 5 have asynchronously published, via the sending of messages to the gateway 6, the virtualization services which they provide as well as the connection information required for accessing these services (steps E10, E30, E50 of FIG. 5).

Upon receiving these messages, the gateway 6 updates the database 9 so as to reflect the current services provided by the platforms 3, 4 and 5 as well as the corresponding connection information (steps E20, E40 and E60 of FIG. 5), as described earlier.

It is now assumed that the user U requires the establishment of the virtual computer environment VE via his/her terminal 2, for example by launching a suitable web application LAUNCH installed on the latter (step F10, FIG. 6). Such an application is known per se and will not be further described here. The launching of this application LAUNCH triggers execution of the WWS maintaining JavaScript® module integrated into the browser 7.

The application LAUNCH sends a HTTP request to the WWS maintaining module identifying the virtualization service demanded by the user U, and selected from a predetermined list of virtualization services (for example including here the services VS3, VS4 and VS5 provided by the platforms 3, 4 and 5).

As an illustration, it is assumed here that the virtualization service demanded by the user U of the terminal 2 is the virtualization service VS3 of the VDI type provided by the platform 3.

Upon receiving this request (step E70 of FIG. 5), the browser 7, via the WWS maintaining module, establishes a communication session with the virtualization gateway 6 by transmitting to the latter an HTTP request R for accessing the service VS3 provided by the platform 3 (step E80 of FIG. 5).

The access request R is derived from the request received by the WWS maintaining module and transmitted by the web application launched by the user U. It further comprises in a way known per se, the technical characteristics of the browser 7 (capacities, supported HTML version (HTML5 here), etc.).

Upon receiving the access request R, the virtualization gateway 6 checks that the virtualization service requested by the terminal 2 is compatible with the virtualization services published by the platforms 3, 4 and 5 (step E90 of FIG. 5).

For this purpose, it consults the database 9 and checks that the service requested by the terminal 2 is actually contained in the latter.

If the service requested by the terminal 2 is not contained in the base 9, the gateway 6 rejects the access request transmitted by the terminal 2 via its browser 7, and the virtual environment VE cannot be established.

In the example contemplated here, the service VS3 requested by the terminal 2 is actually included in the database 9.

The gateway 6 then extracts from the database 9, the connection information CX-INFO3 communicated by the platform 3 for accessing the service VS3.

Next it generates, from this connection information, a system application JSApp adapted to the terminal 2, and more particularly to its browser 7, as well as to the service VS3. This system application is, in the embodiment described here, a JavaScript® application (step E100 of FIG. 5).

Alternatively, other languages may be used for this application, such as for example the ECMAScript language (and notably its version 5).

More specifically, the JSApp system application comprises a connection module CX-MOD3 for the platform 3 intended to allow the terminal 2, and more specifically its browser 7, to negotiate with the platform 3 the establishment and the maintaining of a communication session, and this in order to be able to access to the service VS3. This connection module CX-MOD3 is a JavaScript® module. It appears as a set of programming interfaces of the API (application programming interface) type, in other words of functions intended to allow interaction between the browser 7 and the platform 3, and notably integrating the URL of the platform 3, the designation of the authentication mechanisms required at this platform, and that of the session initiation protocol applied by the platform 3, etc. The connection module CX-MOD3 is thus able to manage the whole of the establishment of the connection with the platform 3.

The connection module CX-MOD3 is adapted to the service VS3 in the sense that it integrates the parameters for connecting to the platform 3 (e.g. URL, ports, etc.) allowing negotiation of the establishment and maintaining of a communication session with the latter with view to accessing the service VS3.

However, it should be noted that except for these connection parameters which are specific to the platform 3 and therefore to the service VS3, it is possible to contemplate that the other functionalities implemented by the connection module CX-MOD3 (typically related to the negotiation, strictly speaking, of the establishment and maintaining of a communication session with the platform) are generic and independent of the service VS3 (in other words, these functionalities are the same for the module CX-MOD3 for connecting with the platform 3 than for an equivalent module for connecting with the platform 4 or with the platform 5). Indeed, this connection module does not integrate, strictly speaking, the ciphering and/or coding algorithms or other algorithms required for establishing and maintaining a communication session, but is used for providing the means for establishing a connection with the platform 3 and for negotiating the establishment and maintaining of a communication session.

An example of a connection module CX-MOD3 which may be generated by the gateway 6 and suitable for applying the invention, is a module identical with or similar to the API JavaScript PeerConnection module specified by the WebRTC standard, and which allows sending and receiving of media flows between two entities (browsers or others) implementing real time communication protocols.

More extensive details on this module are notably available on the sites: http://dev.w3.org/2011/webrtc/editor/webrtc.html and http://tools.ietf.org/wg/rtcweb/charters.

In the embodiment described here, the JSApp system application further comprises a stack STACK3 of communication protocols adapted to the terminal 2 and to the service VS3, and intended to be used during a communication session with the platform 3. This stack of protocols STACK3 is a JavaScript® module which notably comprises here:

- the ciphering algorithms which have to be applied during established communication sessions within the scope of the service VS3 (e.g. symmetrical or asymmetrical ciphering algorithms, hashing functions, etc.);
- the codecs used for coding and decoding the media flows exchanged during these sessions (e.g. H.261, H.263, MPEG4, H.264 HEVC, etc.);
- the stack of the transport protocol used during these sessions; and
- the graphic user interface to be used for remotely transferring the display of the virtual environment VE onto the terminal 2, when the virtualization service VS3 is used.

It should be noted that the ciphering algorithms, the codecs, the graphic interface and other communication protocols applied during communication sessions established between the terminal 2 and the virtualization platforms may vary from one virtualization service to another, but also according to the technical characteristics of the terminal 2 and of its browser 7.

These technical characteristics are comprised, in a way known per se, in the HTTP access request R transmitted by the web browser 7, and may easily be extracted from this request by the gateway 6, so as to elaborate a stack of protocols not only adapted to the service VS3 but also to the terminal 2 and to its browser.

In the embodiment described here, it is assumed that the gateway 6 has a pre-established table describing for different services and different types of terminals, the configurations which may be contemplated for the stack of protocols provided in the JSApp system application. The actual stack of protocols (i.e. the JavaScript® module) included in the JSApp system application is then built up from these configurations depending on the characteristics of the terminal and of its browser, and on the service requested by the user.

This pre-established table is for example stored in the non-volatile memory 6D of the gateway 6. Establishing such a table does not exhibit any difficulty for the person skilled in the art and will not be further described here.

Of course, other communication protocols may alternatively be specified in the stack of protocols STACK3. These protocols may be selected according to the characteristics of the terminal 2 and/or of its browser 7 and/or of the service VS3, or on the contrary are independent of the terminal, of its browser and of the service VS3.

In the embodiment described here, in order to establish a complete virtual environment VE for the user U, the gateway 6 also generates a module CX-MOD4 for connecting to the platform 4 for the service VS4, as well as a module CX-MOD5 for connecting to the platform 5 for the service VS5 and integrates them into the JSApp system application. These connection modules are generated in a similar way to the connection module CX-MOD3 and are respectively able to allow the terminal 2 to negotiate the establishment and maintaining of a communication session with the platform 4 in order to access the service VS4 and/or with the platform 5 in order to access the service VS5, if the user U desires this.

Moreover, the gateway 6 here also integrates into the JSApp application, a stack STACK4 of communication protocols adapted to the terminal 2 (and to its browser 7) and to the service VS4, and a stack STACK5 of communication protocols adapted to the terminal 2 (and to its browser 7) and to the service VS5. These stacks of protocols are determined by the gateway 6 in a similar way to the STACK3 protocol stack.

Alternatively, the JSApp application generated by the gateway 6 only contains the connection module CX-MOD6 and the stack of protocols STACK3 relating to the service VS3.

The thereby generated JSApp application is transmitted in response to the access request R to the browser 7 (step E110 of FIG. 5), in an HTTP request.

This JSApp application is received by the browser 7, and executed by the latter by means of the WWS module (step E120 of FIG. 5).

This execution results in the installation in the browser 7 of the connection modules CX-MOD3, CX-MOD4 and CX-MOD5 and of the communication protocol stacks STACK3, STACK4 and STACK5 contained in the JSApp application.

Moreover, subsequently to this installation, the browser 7 initiates via the WWS module, by using the connection module CX-MOD3, a negotiation with the platform 3 with view to establishing and maintaining a communication session with the latter in order to access the virtualization service VS3 (step E130 of FIG. 5). This negotiation follows the conventional scheme of a multimedia session negotiation between two entities of a network (synchronization between the entities, establishment of a management session, and initiation of a transmission session, etc.), and does not exhibit any difficulty per se for one skilled in the art. It notably consists in the application of authentication mechanisms (specified in the connection module CX-MOD3), and in the exchange of information between the terminal 2 and the platform 3 allowing negotiation of the establishment and the maintaining of a communication session between the terminal 2 (or more specifically its browser 7), and the platform 3. The terminal 2 for this purpose uses the session initiation protocol identified in the connection module CX-MOD3.

If the negotiation is positive, a communication session SESS3 is then established with the platform 3 (step E140 of FIG. 5), and the user U thus accesses the virtualization service 3 via this session. The exchanges between the browser 7 and the platform 3 are based, during the communication session SESS3, on the communication protocols specified in the stack STACK3.

Communication sessions SESS4 and SESS5 may be negotiated and established in a similar way between the browser 7 and the platforms 4 and 5 (steps E150-E180 of FIG. 5), on the basis of the connection modules CX-MOD4 and CX-MOD5 and on the protocol stacks STACK4 and STACK5 respectively.

Alternatively, the sessions SESS4 and SESS5 are only established when the user specifically transmits a request for access to the services VS4 and VS5 (for example via the selection of these services in the LAUNCH application installed on the terminal 2 and allowing initiation of the virtual environment VE), these requests being processed in a similar way to the request R by the gateway 6 (in other words, according to a processing method in accordance with the invention).

According to the invention, the communication sessions SESS3, SESS4 and SESS5 established for supporting the virtual environment VE (step F20 of FIG. 6) are managed and maintained by the WWS maintaining module of the browser 7 of the terminal 2 (step F30 of FIG. 6).

More generally, the WWS maintaining module of the browser 7 of the terminal 2 is responsible for maintaining the virtual computer environment VE, and should notably for this purpose ensure compatibility between them of the communication sessions SESS3, SESS4 and SESS5 established with the different virtualization platforms 3, 4 and 5, as well as the availability of the virtual environment VE for the user. By availability, is meant here the operation and the accessibility of the virtual environment VE. Therefore this is notably here ensuring proper synchronization of the remote transfer of the display of the virtual environment resulting from the sessions SESS3, SESS4 and SESS5 with the platforms onto the screen of the terminal 2.

Ensuring the maintaining of a virtual environment is known from the state of the art, wherein a single communication session is established with a virtualization platform (e.g. VDI, SBC, or based on a web interface). This maintaining is generally ensured by means of a state machine defining the different states of the session and the transition from one state to another depending on different events. Document RFC3261 and the document entitled "JavaScript Session Establishment Protocol, draft-ietf-rtcweb-jsep-00" edited by IETF describe such state machines.

According to the invention, several communication sessions may be established in parallel with several virtualization platforms. In order to ensure the maintaining of the virtual environment VE resulting from these sessions, the WWS maintaining module of the browser 7 of the terminal 2 uses here two levels of state machines, and more specifically:

- a state machine ST-MG, said to be global, defining different possible states for the virtual computer environment VE, such as for example, initialization of the virtual environment, synchronization with a platform (or equivalently, negotiation of a management session with this platform), service being executed, etc., and the transitions giving the possibility of switching from one state to another depending on predetermined events; and
- for each virtualization platform, with which a communication session is established in the virtual computer environment VE, a state machine defining different possible states for this communication session, such as for example initiation of the session, close session, re-initialization of the session, communication session in progress (i.e. invocation of the service), etc., as well as the transitions giving the possibility of passing from one state to another depending on predetermined events. In other words, in the example contemplated in FIG. 1, the WWS maintaining module of the browser 7 of the terminal considers three distinct state machines, ST-M3, ST-M4 and ST-M5, respectively, dedicated to monitoring and to controlling the SESS3 session, the SESS4 session and the SESS5 session. In this way, if a connection with one of the platforms 3, 4 or 5 is perturbed, only the current communication session with this platform will be perturbed. The WWS environment and its sessions with the other platforms will not be impacted.

Such state machines are known per se and will not be further described here. By this double level of state machines, one makes sure that if a connection to a virtualization platform is perturbed, only the service provided by this platform is interrupted. The virtual environment VE is maintained and relies on the other communication sessions in progress.

The invention claimed is:

1. A method for processing access requests to computer virtualization services, performed by a virtualization gateway, the virtualization gateway maintaining a database of a plurality of virtualization platforms, the database containing for each virtualization platform from among the plurality of virtualization platforms, at least one computer virtualization service provided by the virtualization platform and connection information allowing access to the at least one computer virtualization service via the virtualization platform, the method comprising:

receiving an access request from a terminal, the access request specifying a computer virtualization service provided by a virtualization platform of the plurality of virtualization platforms for the purpose of receiving the specified computer virtualization service at the terminal, the access request transmitted by a web browser installed on the terminal and comprising technical characteristics of the web browser;

upon determining that the specified computer virtualization service is contained in the database maintained by the gateway, generating a system application adapted to the specified computer virtualization service, using connection information associated in the database with the specified computer virtualization service, and to the technical characteristics of the web browser of the terminal, the system application being configured for installation in the web browser of the terminal and execution by the web browser to connect to the virtualization platform providing the specified computer virtualization service, to allow the terminal to negotiate establishment and maintenance of a communication session with the virtualization platform, wherein the connection information associated in the database with the specified computer virtualization service comprises prerequisite information for negotiating the establishment or maintenance with the virtualization platform, and wherein the generated system application includes connection parameters or platform connection scripts, determined from the prerequisite information, for initiating the connection to the virtualization platform upon execution of the system application by the web browser; and sending the generated system application to the web browser installed on the terminal.

2. The method according to claim 1, wherein the system application is further configured to connect to at least one other virtualization platform from among the plurality of virtualization platforms to allow the terminal to negotiate the establishment and maintenance of a communication session with the at least one other platform.

3. The method according to claim 1, wherein the generated system application comprises a stack of communication protocols adapted to the terminal and/or to the requested computer virtualization service for use during the communication session between the terminal and the virtualization platform providing the requested computer virtualization service.

4. The method according to claim 1, further comprising:
receiving a message from a virtualization platform identifying at least one computer virtualization service provided by the virtualization platform and containing connection information for accessing the at least one computer virtualization service via the virtualization platform; and
updating the database with the identified at least one computer virtualization service and the connection information contained in the message.

5. A method performed by a web browser installed on a terminal to receive a computer virtualization service provided by a virtualization platform, the method comprising:
sending by the web browser, to a virtualization gateway, an access request specifying the computer virtualization service for the purpose of receiving the specified computer virtualization service at the terminal, the access request comprising technical characteristics of the web browser;
receiving by the web browser, from the virtualization gateway, a system application adapted to the specified computer virtualization service and to the technical characteristics of the web browser and configured for installation in the web browser and execution by the web browser to connect to the virtualization platform providing the specified computer virtualization service, to allow the terminal to negotiate establishment and maintenance of a communication session with the virtualization platform, the system application generated using connection information associated with the specified computer virtualization service in a database maintained by the virtualization gateway, wherein the connection information associated in the database with the specified computer virtualization service comprises prerequisite information for negotiating the establishment or maintenance with the virtualization platform; and executing by the web browser, the received system application, including the establishment of the communication session with the virtualization platform and maintaining the communication session with the virtualization platform in order to receive the specified computer virtualization service via the communication session at the terminal, wherein the generated system application includes connection parameters or platform connection scripts, determined from the prerequisite information, used in establishing the connection to the virtualization platform.

6. A method for management of a virtual computer environment, the method performed by a web browser installed on a terminal and comprising:

performing the method of claim 5, establishing by the web browser, in the virtual computer environment, at least one communication session with at least one virtualization platform providing a computer virtualization service, the at least one communication session being established following the performance by the terminal of the method of claim 5; and maintaining the virtual computer environment by the web browser using:

a state machine defining different possible states for the virtual computer environment; and for each virtualization platform with which a communication session is established in the virtual computer environment during the establishment process, a state machine defining different possible states for the communication session.

7. A non-transitory computer-readable medium having stored thereon instructions for performing the method of claim 1 when the instructions are executed by a computer.

8. A non-transitory computer-readable medium having stored thereon instructions for performing the method of claim 5 when the instructions are executed by a computer.

9. A virtualization gateway comprising:

a database of a plurality of virtualization platforms, the database containing, for each virtualization platform from among the plurality of virtualization platforms, at least one computer virtualization service provided by the virtualization platform and connection information allowing access to the at least one computer virtualization service via the virtualization platform; wherein the virtualization gateway is configured to:

receive an access request from a terminal, the access request specifying a computer virtualization service provided by a virtualization platform of the plurality of virtualization platforms for the purpose of receiving the specified computer virtualization service at the terminal, the access request transmitted by a web browser installed on the terminal and comprising technical characteristics of the web browser;

check, upon receipt of the access request, whether the specified computer virtualization service is contained in the database;

generate, upon determining that the specified computer virtualization service is contained in the database, a system application adapted to the specified computer virtualization service, using connection information associated in the database with the specified computer virtualization service, and to the technical characteristics of the web browser the system application being configured for installation in the web browser of the terminal and execution by the web browser to connect to the virtualization platform providing the specified computer virtualization service, to allow the terminal to negotiate establishment and maintenance of a communication session with the virtualization platform, wherein the connection information associated in the database with the specified computer virtualization service comprises prerequisite information for negotiating the establishment or maintenance with the virtualization platform, and wherein the generated system application includes connection parameters or platform connection scripts, determined from the prerequisite information, for initiating the connection to the virtualization platform upon execution of the system application by the web browser; and send the generated system application to the web browser installed on the terminal.

10. A non-transitory computer readable medium having stored thereon instructions, which when executed by a processor of a terminal, cause the processor to:

send, by a web browser installed on the terminal, to a virtualization gateway an access request specifying a computer virtualization service provided by a virtualization platform for the purpose of receiving the specified computer virtualization service at the terminal, the access request comprising technical characteristics of the web browser;

receive, by the web browser, from the virtualization gateway, a system application adapted to the specified computer virtualization service and to the technical characteristics of the web browser and configured for installation in the web browser and execution by the web browser to connect to the virtualization platform providing the specified computer virtualization service, to allow the terminal to negotiate establishment and maintenance of a communication session with the virtualization platform, the system application generated using connection information associated with the specified computer virtualization service in a database maintained by the virtualization gateway, wherein the connection information associated in the database with the specified computer virtualization service comprises prerequisite information for negotiating the establishment or maintenance with the virtualization platform;

execute, by the web browser, the received system application to negotiate the establishment of the communication session with the virtualization platform and to maintain the communication session with the virtualization platform in order to receive the specified computer virtualization service via the communication session at the terminal, wherein the generated system application includes connection parameters or platform connection scripts, determined from the prerequisite information, used in negotiating the establishment of the communication session with the virtualization platform.

11. The non-transitory computer readable medium according to claim 10, wherein the web browser is further configured to manage a virtual computer environment in which at least one communication session with at least one virtualization platform providing a computer virtualization service is established and wherein the virtual computer environment is maintained using:

a state machine defining different possible states for the virtual computer environment; and for each virtualization platform with which a communication session is established in the virtual computer environment during the establishment process, a state machine defining different possible states for the communication session.

12. A terminal comprising a processor and the non-transitory computer readable medium of claim 10.

13. A system comprising:
the terminal of claim 12;
a plurality of virtualization platforms providing a plurality of computer virtualization services; and
a virtualization gateway configured to process the access request, wherein the virtualization gateway comprises:
a database containing, for each virtualization platform from among the plurality of virtualization platforms, at least one computer virtualization service provided by the virtualization platform and connection information allowing access to the at least one computer virtualization service via the virtualization platform; wherein the virtualization gateway is further configured to:
receive an access request from the terminal specifying a computer virtualization service provided by a virtualization platform of the plurality of virtualization platforms, the access request transmitted by a web browser installed on the terminal and comprising technical characteristics of the web browser;
check, upon receipt of the access request, whether the specified computer virtualization service is contained in the database;
generate, upon determining that the specified computer virtualization service is contained in the database, a system application adapted to the specified computer virtualization service, using connection information associated in the database with the specified computer virtualization service, and to the technical characteristics of the web browser, the system application being configured for installation in the web browser of the terminal and for execution by the web browser to connect to the virtualization platform providing the specified computer virtualization service, to allow the terminal to negotiate establishment and maintenance of a communication session with the virtualization platform; and
send the generated system application to the web browser installed on the terminal.

14. The system according to claim 13, wherein the plurality of virtualization platforms comprises at least two platforms from among:
a virtualization platform of a virtual desktop infrastructure (VDI) type;
a virtualization platform of centralized applications of a server-based computing (SBC) type; and
a virtualization platform of applications and/or of operating systems using a web interface.

15. The system according to claim 13 wherein at least one of the plurality of virtualization platforms is configured to send asynchronous messages to the virtualization gateway informing the virtualization gateway of supported computer virtualization services and containing connection information associated with the supported computer virtualization services.

16. A non-transitory computer-readable medium having stored thereon instructions for performing the management method of claim 6 when said instructions are executed by a computer.

* * * * *